US012762266B2

(12) United States Patent
Mckendree et al.

(10) Patent No.: US 12,762,266 B2
(45) Date of Patent: *Oct. 13, 2026

(54) DISTRIBUTED AND BLOCKCHAIN-BASED STUDENT ACADEMIC LEDGER SYSTEMS AND METHODS

(71) Applicant: Oracle International Corporation, Redwood Shores, CA (US)

(72) Inventors: James Thomas Mckendree, Elizabeth, CO (US); Egidio Loch Terra, San Mateo, CA (US); Luba Schuyler, Amsterdam (NL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,935

(22) Filed: Dec. 23, 2024

(65) Prior Publication Data

US 2025/0124159 A1 Apr. 17, 2025

Related U.S. Application Data

(63) Continuation of application No. 16/657,906, filed on Oct. 18, 2019, now Pat. No. 12,174,982.

(Continued)

(51) Int. Cl.
*G06F 21/62* (2013.01)
*G06F 9/451* (2018.01)

(Continued)

(52) U.S. Cl.
CPC .......... *G06F 21/6218* (2013.01); *G06F 9/451* (2018.02); *G06Q 50/205* (2013.01); *H04L 9/30* (2013.01); *H04L 9/50* (2022.05)

(58) Field of Classification Search
CPC ...... G06F 21/6218; G06F 9/451; G06F 21/64; G06Q 50/205; H04L 9/30; H04L 9/50; H04L 9/0891; H04L 9/3239; H04L 9/3247
See application file for complete search history.

(56) References Cited

U.S. PATENT DOCUMENTS 10,778,597 B1 * 9/2020 Tan .......................... H04L 67/02
2017/0236123 A1 * 8/2017 Ali ...................... G06Q 20/3825
705/75

(Continued)

FOREIGN PATENT DOCUMENTS

WO WO-2018209222 A1 * 11/2018 ......... G06F 16/2365

*Primary Examiner* — Patrick McAtee
*Assistant Examiner* — Vincent I Idiake
(74) *Attorney, Agent, or Firm* — Invoke

(57) ABSTRACT

Techniques for generating and maintaining a student academic ledger are disclosed. In some embodiments, student data is received from a first set of one or more members of a blockchain network. In response, one or more distributed ledgers are updated in the blockchain network. The distributed ledgers are accessible to a student member of the blockchain network using a private key. The blockchain network receives requests from the student member to initiate a transaction with a second set of one or more members that requires access to at least a subset of the student data. Responsive to the request, the second set of one or more members are granted access to at least the subset of the student data from at least one distributed ledger.

20 Claims, 13 Drawing Sheets

Related U.S. Application Data

(60) Provisional application No. 62/748,153, filed on Oct. 19, 2018.

(51) Int. Cl.

| | |
|---|---|
| ***G06Q 50/20*** | (2012.01) |
| ***H04L 9/30*** | (2006.01) |
| *H04L 9/00* | (2022.01) |

(56) References Cited

U.S. PATENT DOCUMENTS

| | | | | |
|---|---|---|---|---|
| 2018/0026979 | A1* | 1/2018 | Cox | H04L 63/0428 713/165 |
| 2019/0340946 | A1* | 11/2019 | Elmessiry | G09B 5/12 |
| 2020/0005284 | A1* | 1/2020 | Vijayan | H04L 9/3247 |
| 2020/0007336 | A1* | 1/2020 | Wengel | G06F 16/1824 |
| 2022/0012708 | A1* | 1/2022 | Sidhu | H04L 63/102 |

* cited by examiner

312

DISTRIBUTED AND BLOCKCHAIN-BASED STUDENT ACADEMIC LEDGER SYSTEMS AND METHODS

INCORPORATION BY REFERENCE; DISCLAIMER

Each of the following applications are hereby incorporated by reference: application Ser. No. 16/657,906 filed on Oct. 18, 2019; application No. 62/748,153 filed on Oct. 19, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to distributed computing systems and architectures. In particular, the present disclosure relates to managing academic ledgers for students in a permission-based blockchain network.

BACKGROUND

Student information may be distributed across a variety of systems, with each system independently maintaining a portion of the student information in a secured manner. For example, a student may have attended multiple educational institutions, such as high school, a two-year college, and a four-year university. Each educational institution may maintain official transcripts for a student in an electronic and/or hard copy format. Other institutions may maintain professional certifications, badges, and/or other skill set information for the student.

Students often wish to share official records maintained at one institution with other institutions. For example, students may wish to share transcripts, certifications, and/or other recognized skill sets with a prospective employer. As another example, a student may wish to transfer credits earned at one educational institution to another educational institution. Other items that may need to be shared by the student include standardized and school test scores, essays, papers, projects, letters of recommendation, referrals, and diplomas. In some cases, a student may be allowed to submit this information in an electronic format. However, to mitigate the risk of tampering, students are sometimes required to request the delivery of "official" transcripts and/or other documents from one institution to another through a trusted postal delivery service. This process is often cumbersome and inefficient for students.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
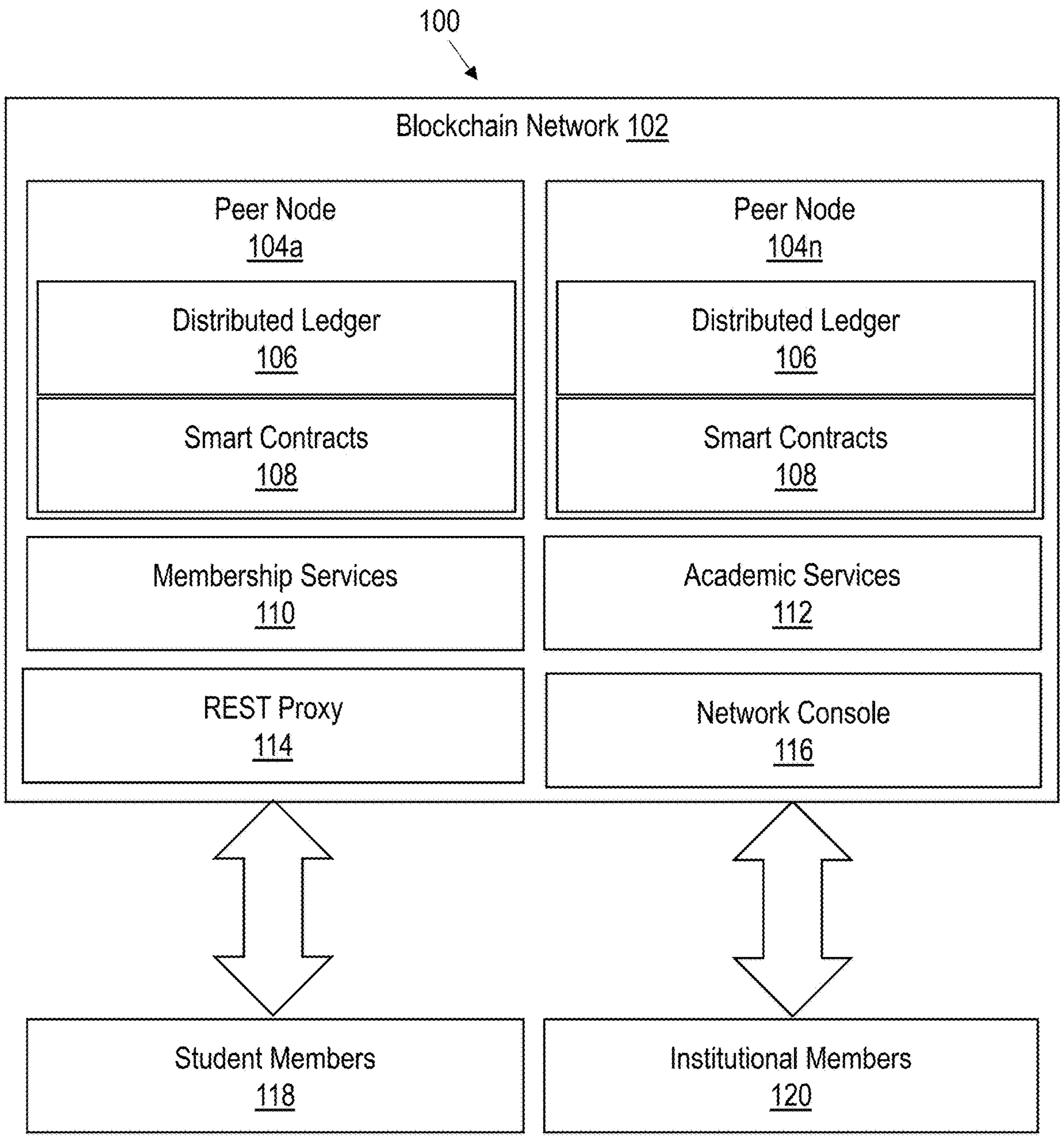
FIG. 1 illustrates an example system for managing student academic ledgers within a blockchain network in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DISTRIBUTED LEDGERS AND PERMISSIONED BLOCKCHAINS
3. ACADEMIC LEDGER TRANSACTION MANAGEMENT
4. EXAMPLE BLOCKCHAIN-BASED APPLICATIONS AND INTERFACES
5. DEPLOYMENT OF PROGRAMS WITHIN THE BLOCKCHAIN NETWORK
6. COMPUTER NETWORKS AND CLOUD NETWORKS
7. HARDWARE OVERVIEW
8. MISCELLANEOUS; EXTENSIONS

1. General Overview

Techniques are described herein for managing student academic ledgers. In some embodiments, a student academic ledger, as used herein, refers to one or more ledgers within a blockchain network through which student data is maintained. Student academic ledgers provide flexibility and shared control over student data. For example, when an institution generates an official record, such as a transcript, the record may be written to a student academic ledger that is accessible to the student via the blockchain network. The student may share official records written to the ledger with other institutions that are members of the blockchain network. While the student may control sharing of official records with other institutions, the blockchain network may restrict the student from editing or otherwise tampering with records written to the ledger. As a result, other members of the blockchain network may trust the contents of the ledger as a unique source of truth.

In some cases, an institution may wish to revoke or remove contents written to a student academic ledger. For example, an institution may wish to revoke a certificate or diploma if cheating, fraud, or human error is discovered. There may be other academic or non-academic reasons for removing content subject to agreements between the institution and the students. The blockchain network may be configured to allow an institution that wrote to a student academic ledger to revoke or remove the contents that were written. Thus, institutions have control over the contents of official records within the blockchain network, even after the contents have been written to a student member's academic ledger. However, the institutions may be prevented from sharing official records with other members of the blockchain network without the student member's consent.

A student member of the blockchain network may allow multiple institutions to write and/or otherwise access the student academic ledger according to some embodiments. For example, a student member may allow high school, two-year, four-year, post-graduate, and/or professional educational institutions to write transcript and/or other student data to the academic ledger. As another example, corporate and other professional institutions may write student data that identifies badges, certifications, skill sets, and/or other achievements officially recognized by the professional institution. The student academic ledger may thus allow student members to access and share information generated at different points in time and from several distinct sources over a student's lifecycle.

In some embodiments, a student member of the blockchain has ownership over or otherwise controls a set of cryptographic keys for accessing the contents of the student academic ledger. For example, a student member of the blockchain network may own a public-private key pairing. The student member may grant public keys to institutional members of the blockchain network to allow the institutional members to write to and/or query the student academic ledger. The student member may use the private key to access the content written by the institutional members to the student academic ledger.

In some embodiments, a student member of the blockchain may restrict or otherwise control the information to which institutional members have access. For example, the student member may select a subset of the student data, such as a particular transcript or standardized test score, to share with another institutional member of the blockchain. In response, a public key may be granted to the institutional member that restricts access only to the specified subset of student data on the student academic ledger.

In some embodiments, student members may initiate transactions within the blockchain network to import and share ledger contents. For example, a student may submit requests to import transcripts and/or other student data with a set of one or more institutional members of the blockchain network. In response, a transaction may be initiated within the blockchain network to add the requested contents to the requesting student member's academic ledger. As another example, a student member may submit a request to initiate a transfer of all or a subset of the student data to another set of one or more institutional members. In response, a blockchain transaction may be initiated that grants the set of institutional members access to the specified ledger content. For example, the institutional members may be provided with a public key that allows queries on the ledger or the content may be directly uploaded to an external system associated with the institutional member.

In some embodiments, student members may trigger execution of blockchain programs, also referred to as chaincode or smart contracts, that access content from a student academic ledger. Student members may invoke blockchain programs to perform a variety of tasks. Examples may include, but are not limited to, matching students to careers, curriculum or institutional members based on student attributes, such as student skill diplomas and skill sets; determining how to transfer credits earned by a student between two institutions; initiating transfer of credits and/or official records between institutions; signing digital certificates; packaging official records; generating curriculum vitae; and applying for jobs and other openings.

One or more embodiments described in this Specification and/or recited in the claims may not be included in this General Overview section.

2. Distributed Ledgers and Academic Blockchain Networks

In some embodiments, the techniques described herein are implemented as a blockchain service. A blockchain service refers to a network service, such as a platform-as-a-service (PaaS) or other cloud service, for maintaining blockchain-based distributed ledgers. A distributed ledger in this context refers to a data object (or set of data objects) that maintain a consensus of facts and the history of the ledgers' updates. Distributed ledgers may be replicated, shared, and/or synchronized across multiple peer nodes within a blockchain network.

In some embodiments, the blockchain service comprises a permissioned blockchain, whereby access to a blockchain network is restricted to permitted institutions and students. Permission may be granted by one or more founding members of a blockchain network or in accordance with a governance model. For example, if an institution wishes to join the permissioned blockchain, other institutional members may vote, or a board may decide whether to grant permission. As another example, permission for educational institutions may be restricted to those that have been accredited by a recognized accreditation agency. Student members may be allowed to join subject to verification of their identity. Other governance models may also be used, depending on the particular implementation.

In some embodiments, the blockchain service generates and maintains accounts for members that have been granted permission to join the blockchain network. Student accounts may include credentials to access a cryptography-based, tamper resistant student ledger. Student members and institutional accounts may initiate transactions to read from and/or write to student ledgers subject to restrictions as described further herein.

FIG. 1 illustrates example system 100, which is a blockchain service for managing student academic ledgers within a blockchain network in accordance with some embodiments. As illustrated in FIG. 1, system 100 includes blockchain network 102, student members 118, and institutional members 120. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. In some cases, multiple components may be combined into one application and/or machine. Operations described with respect to one component may instead be performed by another component.

Blockchain network 102 comprises a set of nodes and services for managing distributed ledgers. Blockchain network may generally comprise peer nodes 104*a-n*, membership services 110, academic services 112, REST proxy 114, and network console 116. Blockchain network 102 may provide a closed ecosystem where only invited organizations and individuals can join the network and keep a copy of a distributed ledger. The distributed ledger may maintain student data, such as transcripts, diplomas, badges, and other officially recognized student skill sets.

In some embodiments, a plurality of peer nodes, such as peer node 104*a* and peer node 104*b*, maintain copies of distributed ledger 106. Transactions within blockchain network 102 may be added to distributed ledger 106 and disseminated to other peer nodes according to a peer-to-peer or consensus protocol. For example, a transaction protocol may include an endorsement step whereby the transaction is accepted or rejected, an ordering step whereby transactions are sorted into a sequence of blocks, and a validation step whereby the endorsement is verified against endorsement and permission policies.

In some embodiments, distributed ledger 106 stores information over a student's lifecycle in a blockchain format. For example, a student ledger may comprise a growing list of records, also referred to as "blocks", that are linked through cryptography. Blocks may be added to the chain when updates occur, such as when an institutional member writes new transcript data to the ledger. Each block within a blockchain may include a cryptographic hash of the previous block that links the blocks together. A block may further comprise a timestamp indicating when the block was generated, the current state of a student ledger, and/or transaction data identifying the transactions (e.g., write operations) that resulted in the current state of the student ledger. The cryptographic link between blocks in a blockchain enhance the tamper-proof nature of a student ledger. Altering the data within one block may require re-computation of the cryptographic hash value for each of the subsequent blocks in the chain. A consensus protocol among the peer nodes may prevent such tampering or may allow tampering only in scenarios agreed upon by a threshold number of peers.

In some embodiments, the plurality of peer nodes further maintain copies of smart contracts 108. Smart contracts 108, also referred to as chaincode, are programs that implement a prescribed interface. For example, smart contracts 108 may define data schemas in an academic ledger, initialize the ledgers, perform updates in response to requests, and respond to queries. Smart contracts 108 may implement operations agreed to by members of blockchain network 102.

In some embodiments, a peer node is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Membership services 110 is configured to manage roles and access policies for members of blockchain network 102 according to some embodiments. For example, membership services 110 may handle adding, verifying, and cancelling membership within blockchain network 102. As another example, membership services 110 may define access policies for different user roles. For instance, membership services 110 may assign student members 118 to different blockchain channels, where each blockchain channel maintains a distributed ledger for a corresponding student. A student member may be granted cryptographic keys to access the corresponding ledger. The cryptographic keys may allow the student member to control which institutional members have access to the contents of the ledger, but the student member may be restricted from editing otherwise modifying the contents of student data in the ledger. Institutional members 120 may be prevented from accessing ledgers unless granted permission (e.g., via a public key) by a student member.

In some embodiments, membership services 110 may further define and enforce different access policies for founding members and participant members. For example, founding members may determine which participant members are able to join blockchain network 102. When a new member is added, a digital certificate may be generated to confirm the identify of the member within blockchain network 102. Founding members may be comprised of a subset of student members 118 and/or institutional members 120. In other cases, founding members may be third-party members that do not participate in the blockchain network 102.

Academic services 112 may be configured to provide pre-assembled and/or custom programs for executing a variety of tasks as a function of student data. For example, academic services 112 may comprise applications for any of the tasks previously mentioned and described further herein, including, but not limited to, matching students to careers, curriculum or institutional members based on student attributes, such as student skill diplomas and skill sets; determining how to transfer credits earned by a student between two institutions; initiating transfer of credits and/or official records between institutions; signing digital certificates; packaging official records; generating curriculum vitae; and applying for jobs and other openings.

REST proxy 114 is a representational state transfer (REST) based endpoint that provides an interface through which blockchain network 102 may be accessed. In some embodiments, REST proxy 114 defines REST application programming interfaces (APIs) to receive REST-based requests to run transactions and queries. For example, student members 118 and/or institutional members 120 may submit, via a browser or other web application, requests to access student data on a ledger or to invoke blockchain programs, such as chaincode. The requests may conform to the hypertext transfer protocol (HTTP), the secure version of HTTP (HTTPS), and/or other communication protocols of the internet protocol (IP) suite. In response, REST proxy 114 may trigger transaction processing and/or invoke the identified blockchain programs to generate a result, which may be returned to the requesting application.

Network console 116 is an interface through which blockchain network 102 may be monitored and administrative tasks may be performed. For example, network console 116 may perform tasks such as managing nodes, configuring blockchain channels and policies, and deploying smart contracts. Network console 116 may also allow for troubleshooting, including viewing the status of peer nodes and accessing log files.

In some embodiments, network console 116 includes a user interface for performing operations within blockchain network 102. Example user interfaces include, but are not limited to, a graphical user interface (GUI), a command line interface (CLI), a haptic interface, and a voice command interface. Examples of user interface elements include, but are not limited to, checkboxes, radio buttons, dropdown lists, list boxes, buttons, toggles, text fields, date and time selectors, command lines, sliders, pages, and forms.

Additional embodiments and/or examples relating to computer networks are described below in Section 6, titled "Computer Networks and Cloud Networks."

3. Academic Ledger Transaction Management

As previously mentioned, peer nodes may be configured to manage transactions within blockchain network 102, including reads and writes to student academic ledgers. For example, peer nodes may endorse, validate, order and/or commit transactions that satisfy prescribed policies. Transactions may be used to add, share, send, and/or export student data via a student academic ledger.

Figure 2:
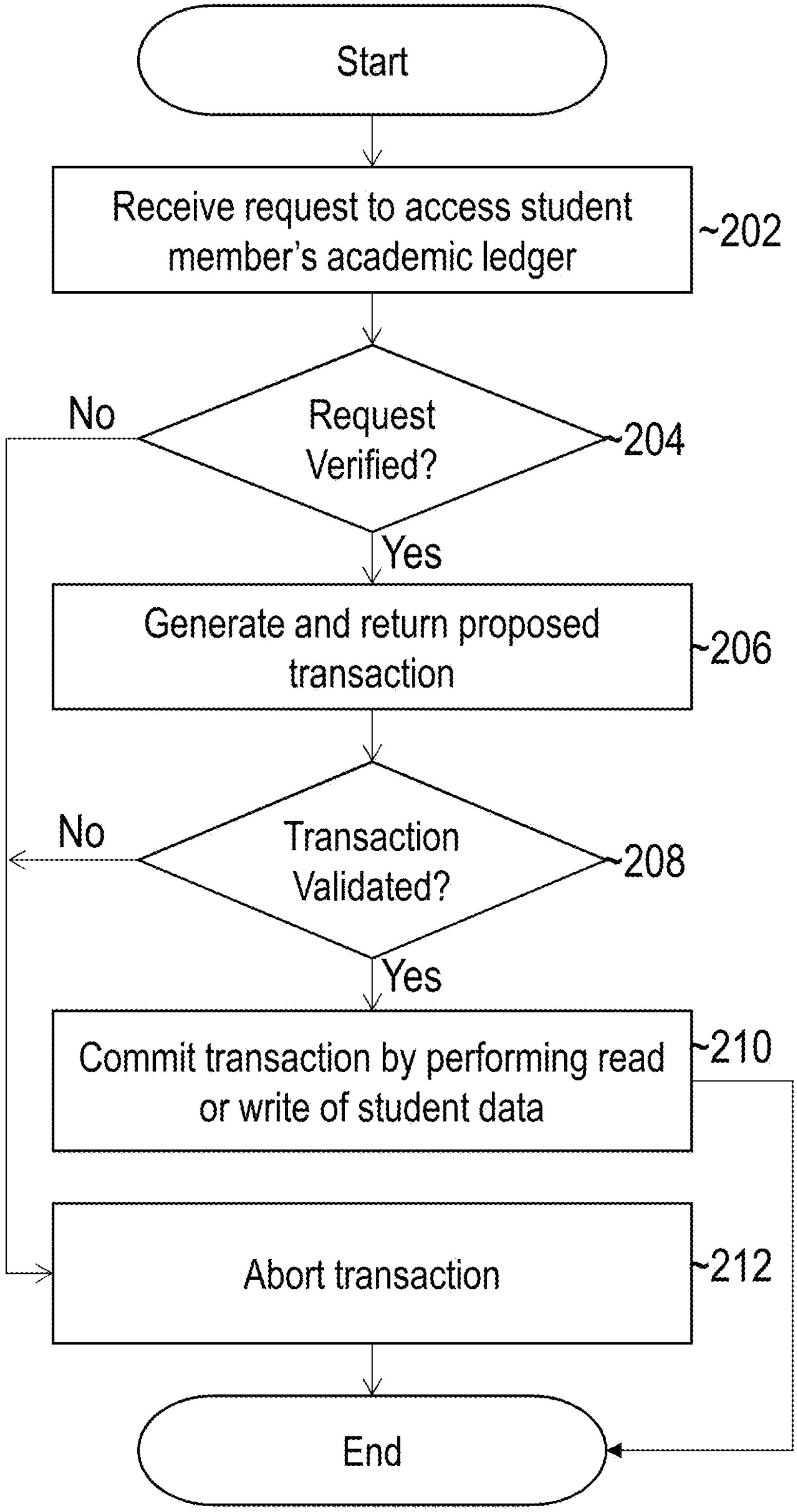
FIG. 2 illustrates an example set of operations for managing blockchain transactions that import content to a student academic ledger and share the contents with other members of the blockchain in accordance with some embodiments.

FIG. 2 illustrates an example set of operations for managing blockchain transactions that import content to a student academic ledger and share the contents with other members of the blockchain in accordance with some embodiments. One or more of the steps may be omitted, repeated, and/or performed in a different order. Accordingly, the specific arrangement of steps shown in FIG. 2 should not be construed as limiting the scope of the embodiments.

Referring to FIG. 2, a peer node receives a request to access (e.g., read from or write to) a student member's academic ledger (operation 202). In some cases, the request may originate with a student member of blockchain network 102. For example, a student member may request to import a transcript, standardized test scores, diplomas, and/or other official records from one or more educational institutions which the student member is currently or has previously attended. As another example, a student member may request to send, transfer, export, or otherwise provide an institutional member with access to all or a portion of the student data in the academic ledger.

In other cases, the request may originate with an institutional member. For example, an educational institution may request to upload a newly issued transcript to a student academic ledger. As another example, a professional institution may request to upload the results of a student internship or may request access to view a student's official transcripts.

During the transaction process, an endorsing peer node verifies the request (operation 204). For example, the peer node may verify that the request follows a prescribed protocol, that the requesting blockchain member has a valid digital signature, and that the requesting blockchain member is authorized to perform the proposed operation on the blockchain channel.

In some embodiments, each update to a ledger is digitally signed. A digital signature may be generated by using a signing member's private key to encrypt a one-way hash of the updated data. For example, an institutional member that is attempting to write new grade information to a student's academic ledger may use the private key associated with the institutional account to encrypt the hash value. Other peer nodes in blockchain network 102 may verify the party attempting to update the student's ledger using the signer's public key to decrypt the hash. If the decrypted hash matches a hash of the same data generated by the peer node, then the endorsing peer node may verify the request. If the hashes do not match, then the transaction may be denied to prevent unauthorized tamping of the ledger contents.

In some embodiments, each blockchain channel maintains a separate ledger, only accessible to peers from authorized blockchain members. The request may specify the blockchain channel by name. The student may control the keys to read to and write from the ledger associated with the blockchain channel. For example, a student may grant a public key to an institutional member to write to the student's ledger. The endorsing peer may verify that the institutional member has the appropriate public keys to execute the transaction. If so, then the transaction may be verified.

In some embodiments, once an institutional member has written to the ledger, the institution may own the keys to modify and/or revoke the content that was written. The student may still prevent the institution from sharing the information with other institutional members. However, the student may be prevented from modifying and/or revoking the ledger contents. Thus, tampering with grades and/or other academic data written to the distributed ledger may be prevented.

If the peer node cannot verify the request, then the transaction is aborted (operation 212) and the process ends.

If the request is properly verified, then the peer node generates and returns a proposed transaction (operation 206). The proposed transaction may include the endorsing peer's digital signature and a read or write set that includes the student data to read or add to the ledger, if available. However, in some embodiments, the peer node does not update the ledger during this operation.

In some embodiments, one or more nodes validate the proposed transaction (operation 208). For example, the peer nodes that are part of the blockchain channel may validate an endorsement policy to determine whether the endorsement criteria are satisfied. The endorsement policy may be breached if a relevant member to the transaction has failed to properly endorse the transaction.

In some embodiments, endorsement policies may specify a threshold number of peers for endorsing a transaction. For example, if a transaction is attempting to write new transcript data to a student's ledger, then an endorsement policy may require digital signatures of two or more endorsing peer nodes before the transaction is allowed.

If the proposed transaction can not be successfully validated, then the transaction is aborted (operation 212) and the process ends. Otherwise, the transaction is committed, and the ledger is updated by either adding the student data or allowing the requested student data to be read (operation 210). In some embodiments, a current state database is maintained for the ledger, and the student data is committed to the database during this operation.

In some embodiments, committing the transaction includes adding a new block to the blockchain that stores the ledger data and transaction history of the ledger. To generate a new block, the process may compute a cryptographic hash value based on the contents of the previous block in the chain. The new block may include a current state of a student ledger, such as the most recent transcript data, most recent certification data, etc. The blocks within the blockchain may capture the progress of a student over time and the transactions history that updated the ledger leading to the current state.

As previously noted, different student-institution blockchain channels may be defined to manage ledgers for different students. Student members may control which institutions are a part of a blockchain channel. For example, student members may invite and/or add educational institutions with which the student is currently or has formerly matriculated or a prospective educational institution that the student would like to attend. As another example, student members may add professional institutions with which the student is currently or has formerly been employed, or a prospective employer with which the student would like to pursue a career.

In some embodiments, student members may define access policies for a blockchain channel in a member-specific manner. For example, a student member may grant an educational institution authority to automatically upload new transcripts to the ledger as new grades are released. Other institutions may be restricted from writing to the ledger unless given express permission by the student member.

In some embodiments, student members may define access policies for a blockchain channel in a group-specific manner. For example, the student member may provide a group of prospective employers in a particular industry with access to an official transcript on the ledger. Other institutional members that are not in the group may be denied read access, even if part of the same blockchain channel.

As previously noted, institutional members may be permitted modify or revoke contents on a ledger in some cases. Contents may be revoked for a variety of reasons, such as data entry errors, cheating or other malfeasance, and/or other reasons. However, a blockchain may be designed to be append-only, such that members are not permitted to modify the contents of previous blocks. In some embodiments, revoking and modifying the contents of a student academic ledger does not modify previously recorded blocks. Rather, revoking the contents may include initiating a transaction, whereby a new block is added to the blockchain. The new block may flag or change data that was previously written to the ledger, which is recorded as a new transaction. With append-only databases, data that has been flagged as deleted may still reside in the database. However, blockchain programs and members may treat the data as if it has been removed.

To prevent unauthorized tampering, the consensus protocol may be designed to tightly restrict which blockchain members may modify and revoke ledger contents. For example, a student member may be prevented from modifying the ledger contents to avoid grade tampering and other potential malfeasance. If a student attempts to modify the data using the cryptographic keys associated with their account, then the transaction may be denied.

In some embodiments, revocation and modifying contents in a blockchain is restricted to the blockchain member that initially wrote the data. For example, an institutional member that wrote transcript data to a student's academic ledger may be the only party permitted to modify the transcript data. The validating peer nodes may verify the digital signature of the member initiating the revocation transaction to determine whether it matches the digital signature of the blockchain transaction that initially wrote the data. If a match is detected, then the revocation transaction may be allowed. Otherwise, the transaction may be aborted to prevent other blockchain members from making unauthorized modifications to the distributed ledger.

4. Example Blockchain-Based Applications and Interfaces

In some embodiments, members of blockchain network 102 may access the network through web applications, such as mobile apps and browsers. The applications may provide a GUI or other interface through which transactions may be initiated and/or blockchain programs (e.g., smart contracts) may be invoked. The application may store a private key that provides the student member with access to the student's academic ledger. The private key may be included in requests submitted to blockchain network 102.

FIG. 3A-3I illustrate example screenshots of an application for viewing the contents of a student academic ledger and initiating ledger-based transactions in accordance with some embodiments. The screenshots are from a mobile phone app. However, similar applications may be installed on other network host devices, such as laptops, desktops, tablets, etc.

Figure 3A:
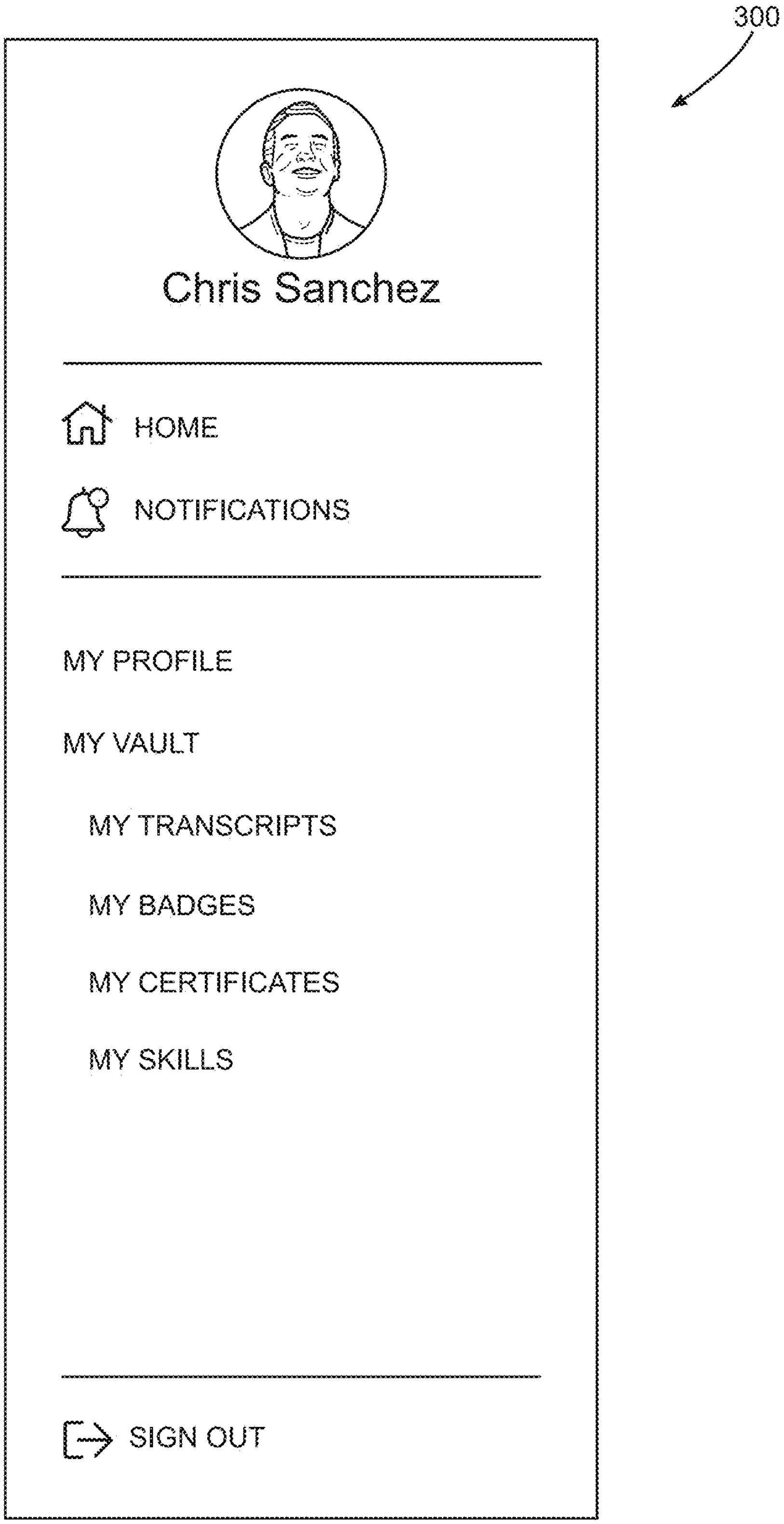
FIG. 3A-3I illustrate example screenshots of an application for viewing the contents of a student academic ledger and initiating ledger-based transactions.

FIG. 3A illustrates navigation interface 300, which includes several links for accessing data from the student's academic ledger. For example, the links allow a user to navigate to a home page or a notification page. The links further allow the student user to view profile information, transcripts, badges, certificates, and skills from the student's academic ledger. The application may thus pull information from the ledger to generate an e-portfolio of student data. Multiple members may write information to a single distributed ledger, which may provide the student with a unified view of student data from various sources.

Figure 3B:
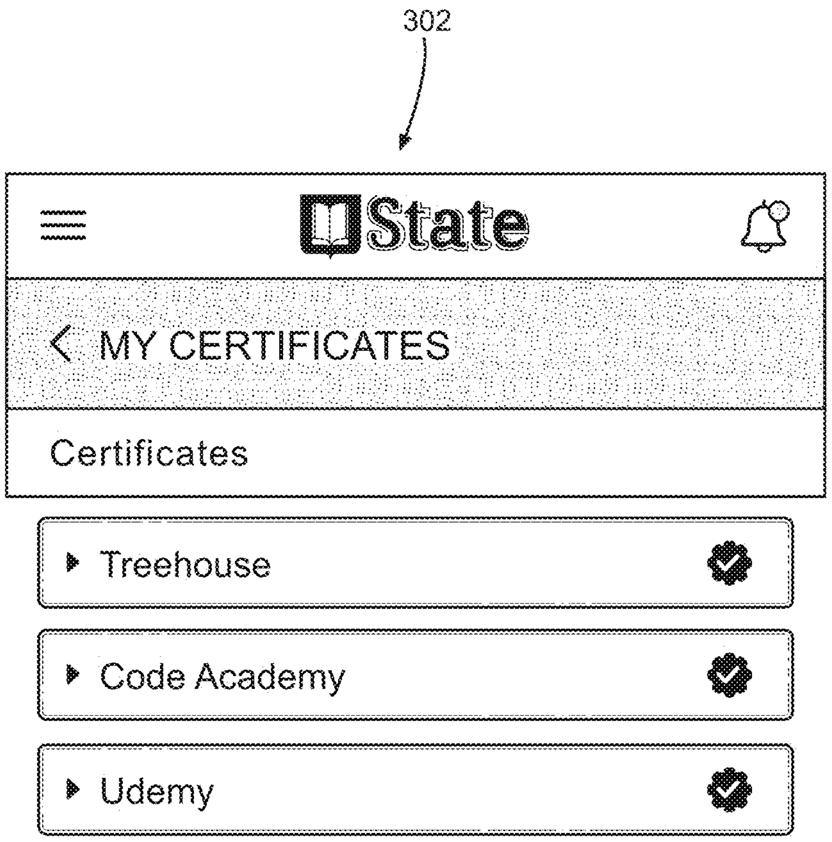

FIG. 3B illustrates example interface 302 for viewing information on certificates. This page may be displayed in response to selecting the "My Certificates" link from navigation interface 300. The page displays certificates earned from massive online open courses such as Treehouse, Code Academy, and Udemy. This page may also display other certifications from other educational and/or professional institutions.

Figure 3C:
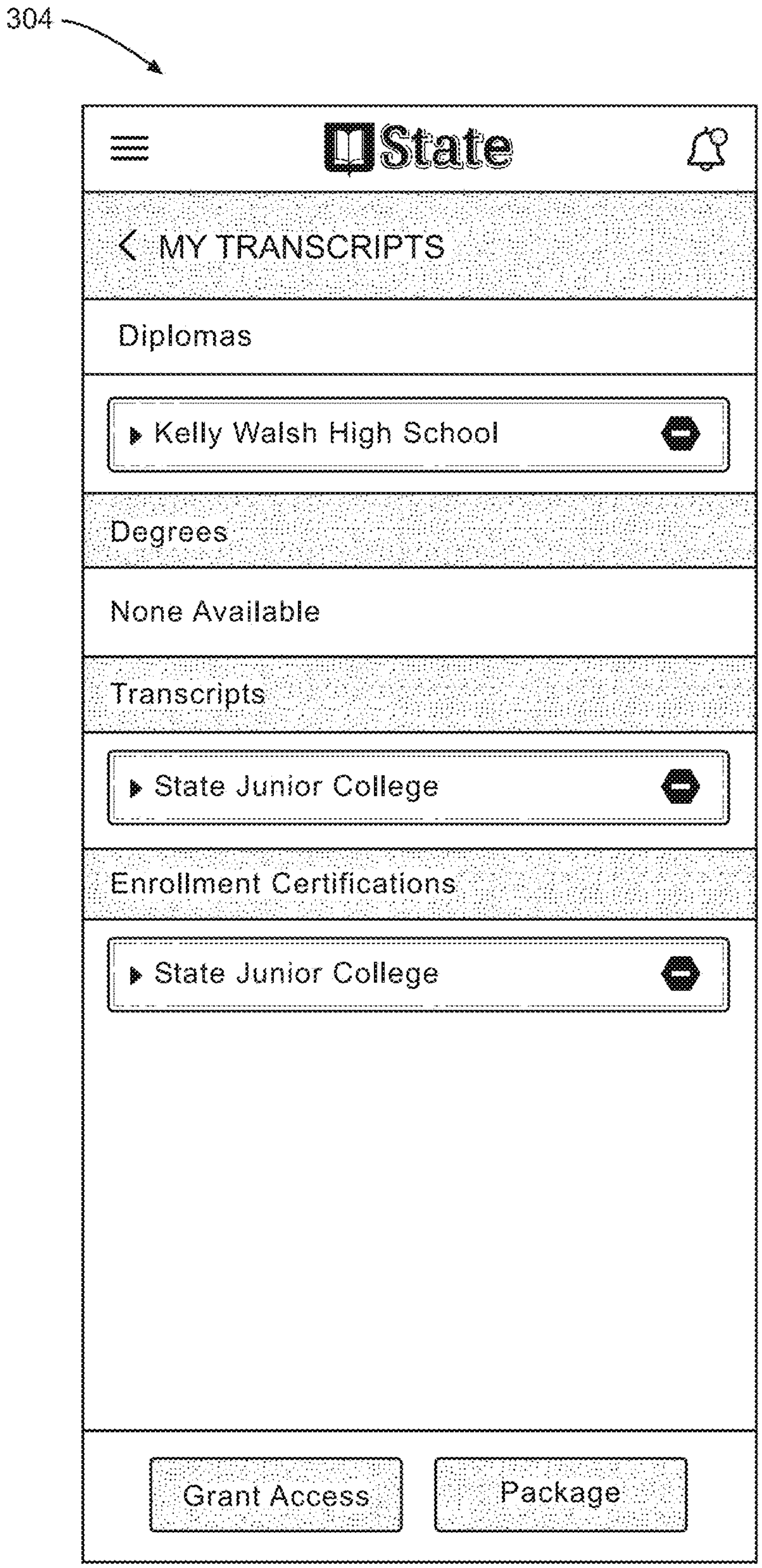

FIG. 3C illustrates example interface 304 for viewing diplomas, degrees, transcripts and enrollment certifications. This page may be displayed in response to selecting the "My Transcripts" link from navigation interface 300. In the present example, a high school diploma and transcripts from a junior college are presented. As the student progresses, the page may be updated to reflect diplomas and transcripts from other institutions, such as universities, graduate schools, professional programs, and trade schools. Interface 304 includes interface elements for granting access and packaging official records. The grant access button allows the user to share one or more of the transcripts with institutional members of blockchain network 102. The package button allows the user to package one or more transcripts in an application or curriculum vitae.

Figure 3D:
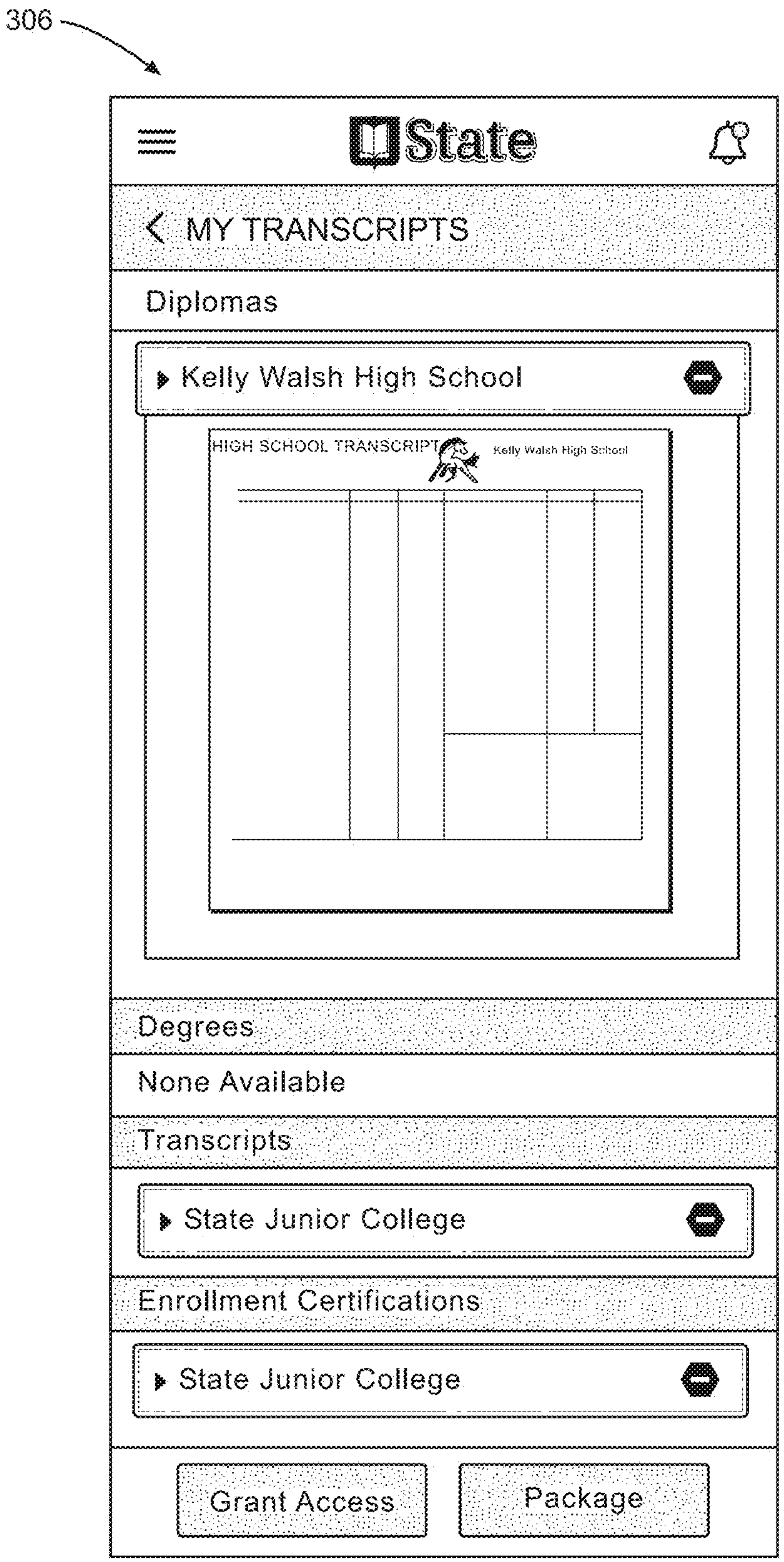

FIG. 3D illustrates example interface 306 for viewing an image of an official record. Specifically, an image of the student members high school diploma is displayed. The official record is pulled from the student's academic ledger and displayed via the mobile application. The official record is written to the academic ledger by the high school, which is also a member of the blockchain network.

Figure 3E:
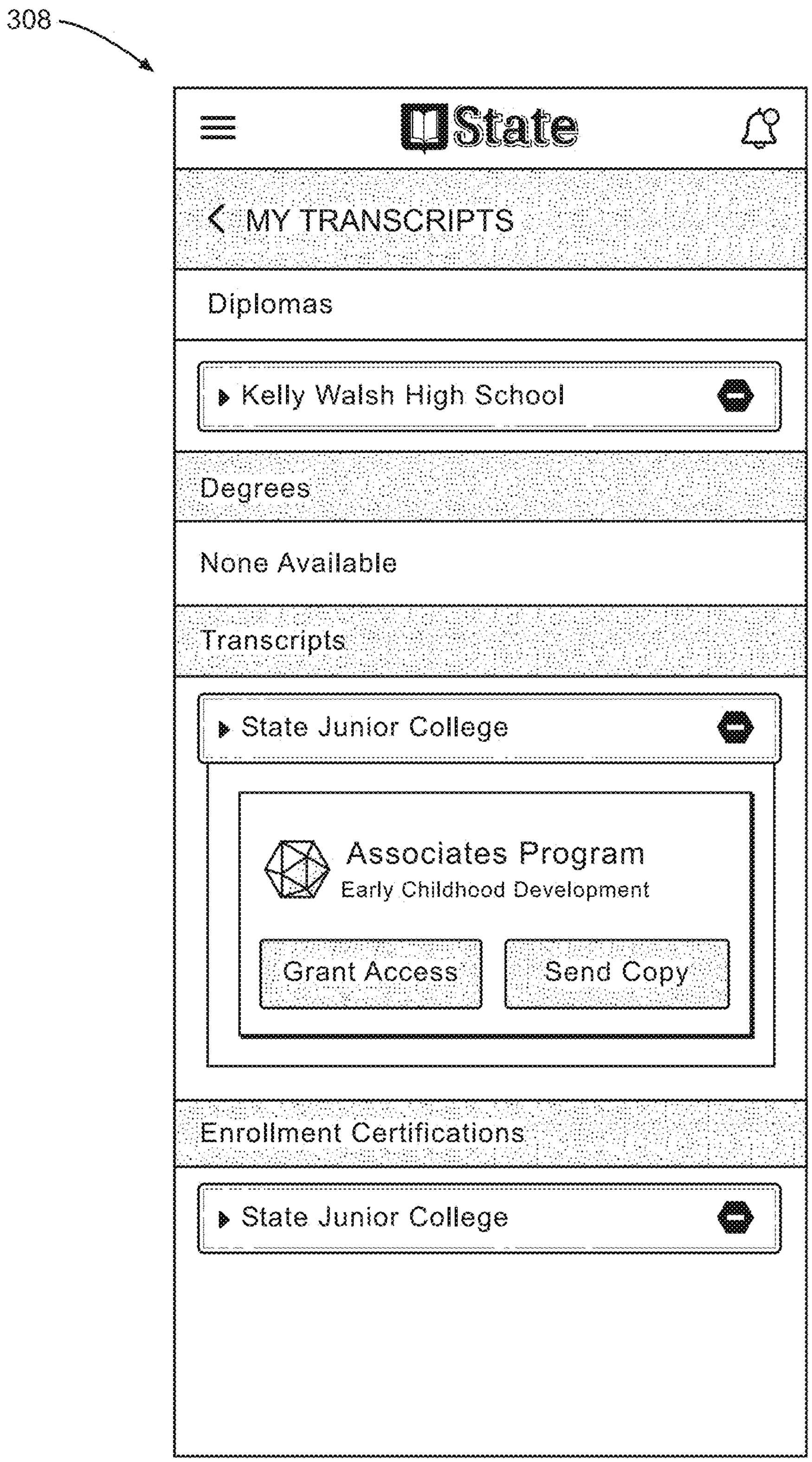

FIG. 3E illustrates example interface 308 for viewing information about a transcript. Interface 308 may be presented in response to the user drilling down on the "State Junior College" section of interface 304 or interface 306. In response, additional information is presented about the degree being pursued. Interface 306 also present an option to grant access or send a copy of the transcript. In response to granting access to an institutional member, the application may provide a public key to the institutional member that allows the institutional member to read the transcripts from the ledger. The student may alternative select "Send Copy" to directly send the transcript to an institution, such as by electronic mail.

Figure 3F:
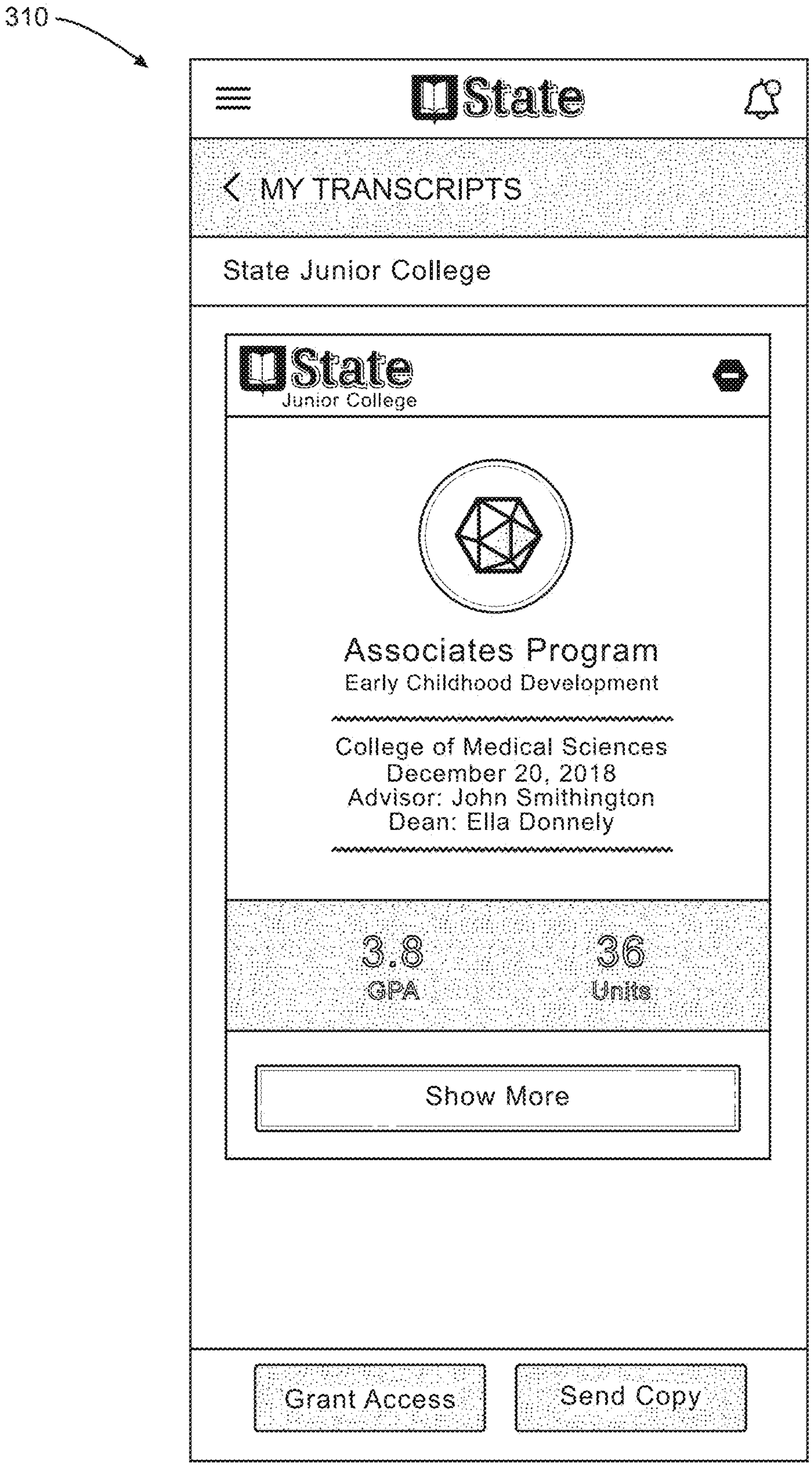

FIG. 3F illustrates example interface 310 for viewing additional information about a transcript. Interface 310 may be presented in response to the user drilling down even further on the "State Junior College" section of interface 308. Interface 310 presents additional information about the transcript, including the student's current grade point average (GPA) the number of units completed, the projected graduation date, the student's advisor, and the dean. The user may select "Show More" to drill down even further.

Figure 3G:
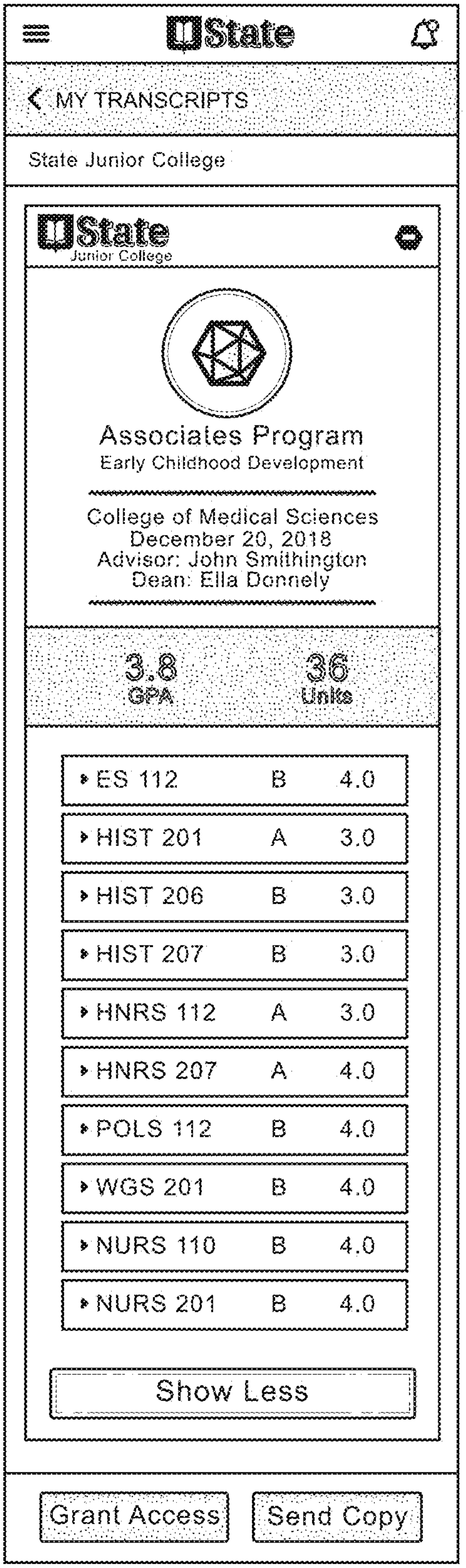

FIG. 3G illustrates example interface 312 which is displayed in response to selecting "Show More" from interface 310. In response to selecting "Show More", the user is presented with a set of classes and corresponding grades. As can be seen, the data in an academic ledger may be layered multiple levels deep, which allows for transcript information to be presented in a format that is easy to digest and navigate.

Figure 3H:
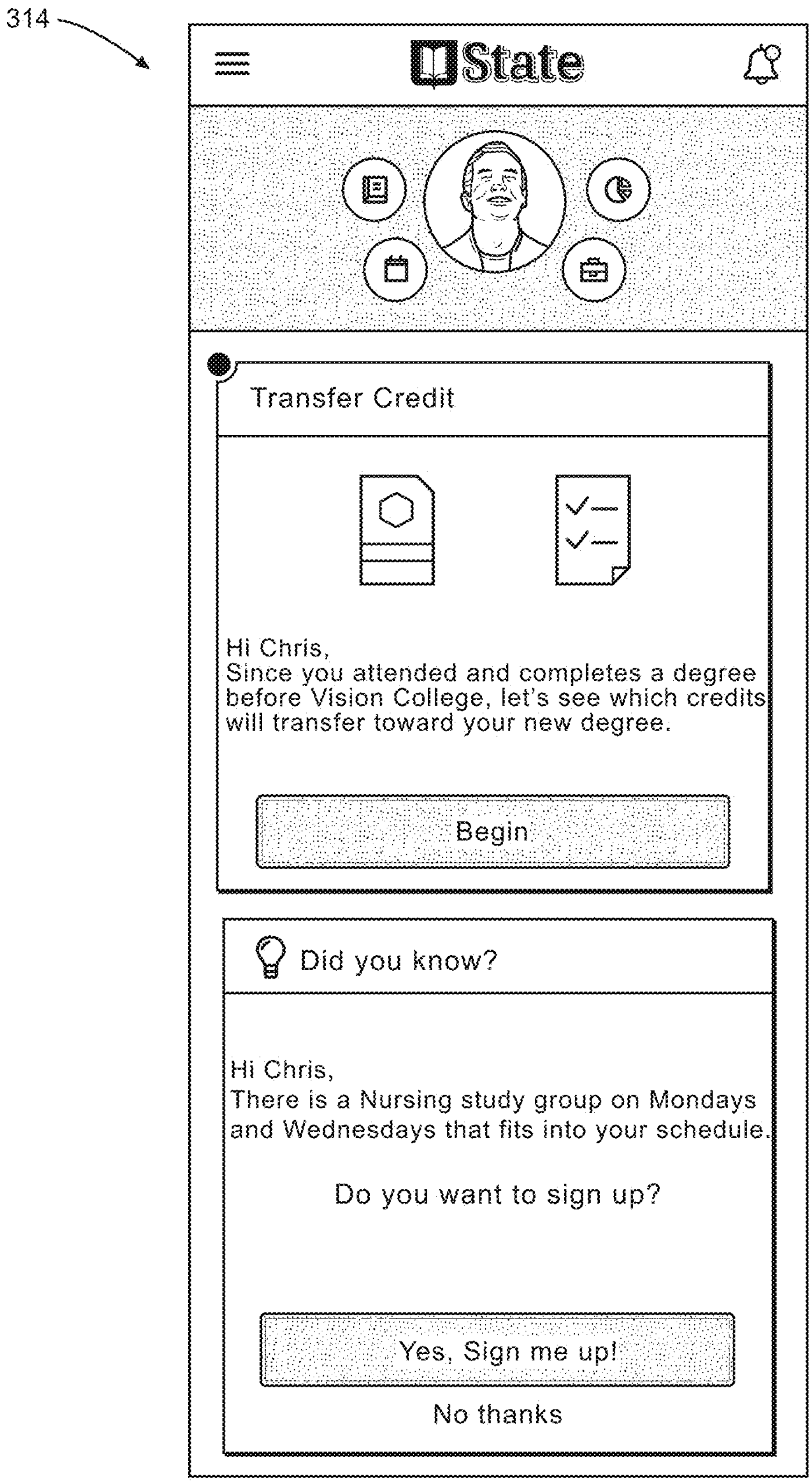

FIG. 3H illustrates example interface 314 for viewing a home page of electronic student portfolio. This page may be displayed when a user first logs in or in response to selecting "Home" from navigation interface 300. The home page may be configured to display items that are most likely to be relevant to the user. For example, interface 314 presents links to initiate the process of transferring credits between educational institutions that the student has attended. Interface 314 further presents information about study groups that are relevant to the student's skill set.

Figure 3I:
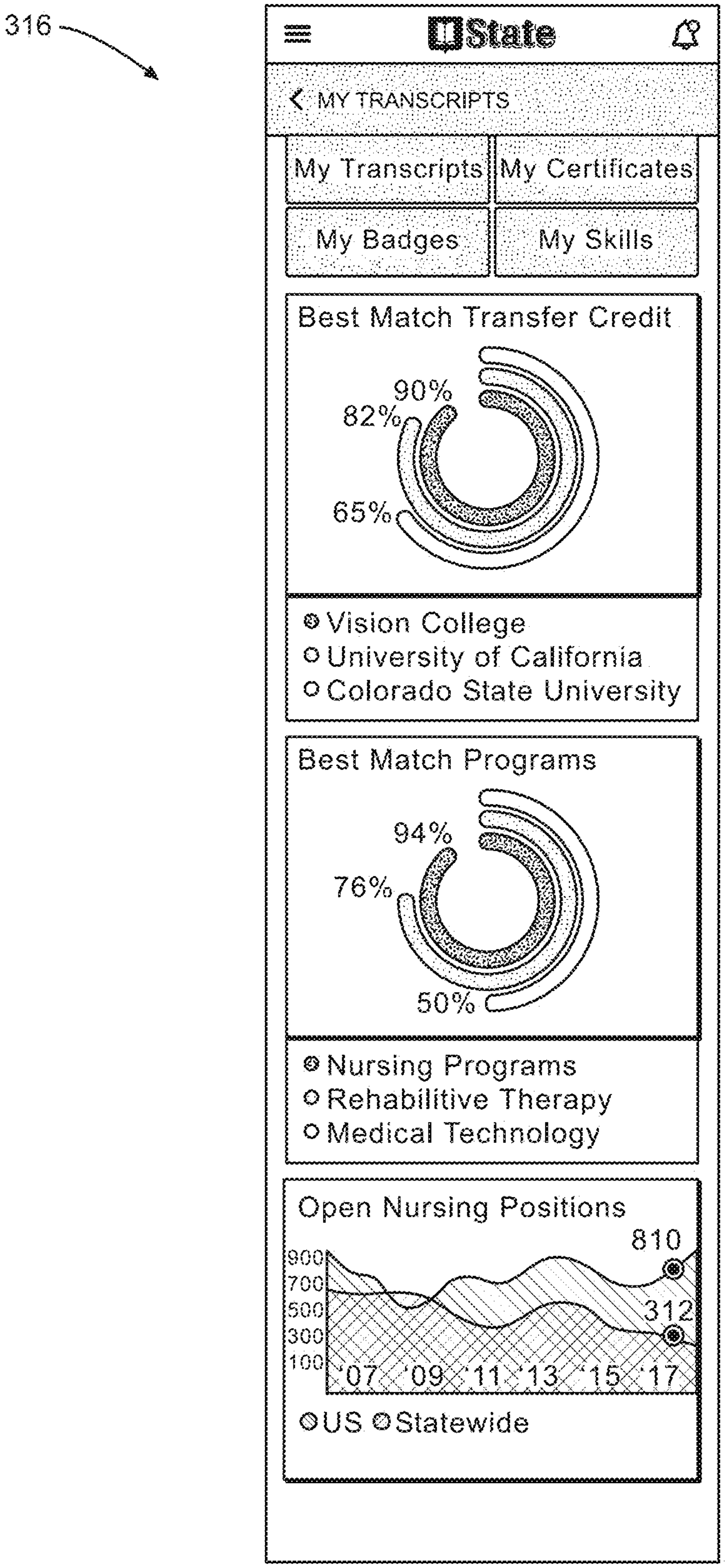

FIG. 3I illustrates example interface 316 for viewing best match transfer credits and programs based on the student's skill set. In the present example, the student is presented with the top three educational institutions in terms of how many credits may be transferred. The interface further presents the top three academic programs that most closely match the student's skill set. The best matches may be determined based on the attributes maintained on the student academic ledger. Blockchain programs, such as chaincode, may be invoked when the user logs in or navigates to interface 316. The programs may access the student data on the ledger, subject to the student's approval, to identify the best matches. Stated another way, the chaincode may determine the best matches as a function of the student data. The logic of the chaincode may vary depending on the particular implementation and the institutional members that are involved.

5. Deployment of Programs Within the Blockchain Network

In some embodiments, institutional members may deploy custom blockchain programs, such as smart contracts, to blockchain network 102. For example, a professional institution may define a smart contract that compares student members to a desired skill set. Students that match the desired skill set may be notified and encouraged to apply for job openings. In another example, the professional institution may provide incentives, such as blockchain credits, to students and/or educational institutions that develop the desired skill set. In yet another example, educational institutions may define functions for mapping transfer credits earned at other institutions. Other applications may similarly be defined as a function of student data. Thus, the functions that are performed by a blockchain program are customizable by members of blockchain network 102 and may vary from implementation to implementation.

When a blockchain program is deployed, a student may invoke the application and grant access to all or a portion of student data on the student's academic ledger. For example, the student may grant access to transcripts, diplomas, badges, and/or other records that identify the student's coursework and/or skill sets. The blockchain program may access the information to return a result to the user. For instance, the blockchain program may accesses information about the student's current course credits and determine how to transfer credits to another educational institution. As another example, the blockchain program may determine whether the student's skill set is a good match for a particular program or job opening.

Figure 4:
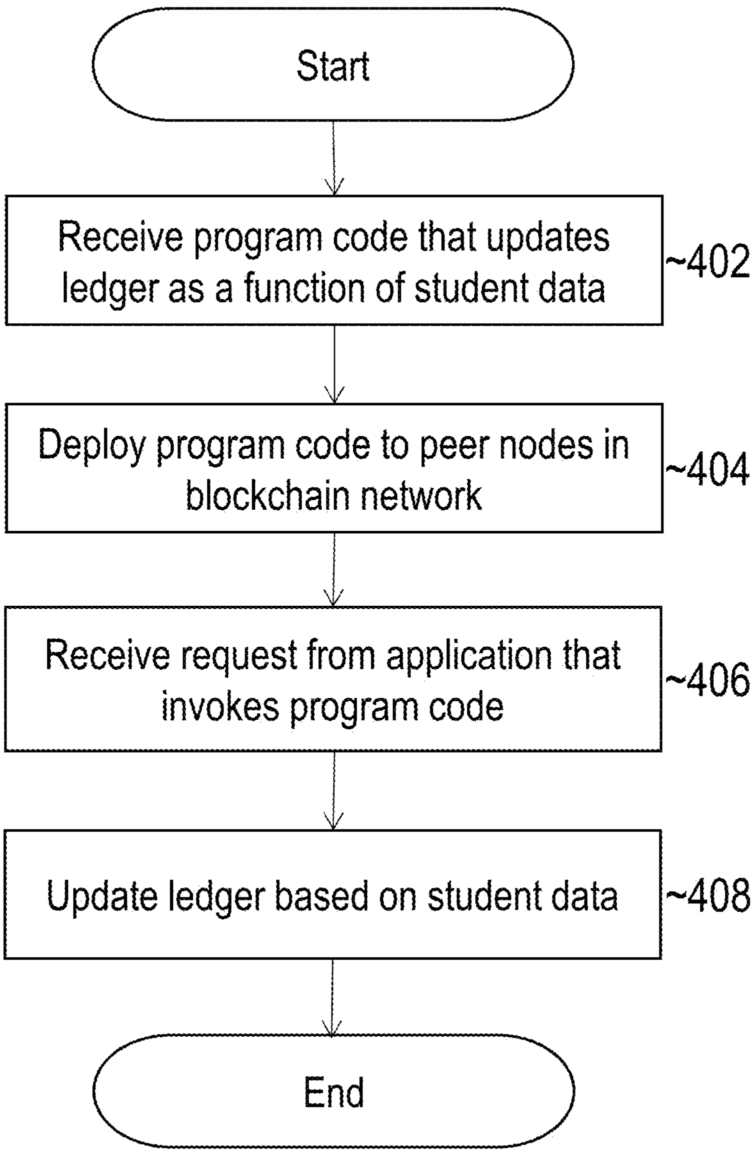
FIG. 4 illustrates an example set of operations for deploying programs in an academic blockchain network in accordance with some embodiments.

FIG. 4 illustrates an example set of operations for deploying programs in an academic blockchain network in accordance with some embodiments. One or more of the steps may be omitted, repeated, and/or performed in a different order. Accordingly, the specific arrangement of steps shown in FIG. 4 should not be construed as limiting the scope of the embodiments.

The set of operations includes receiving, from a member of blockchain network 102, program code that updates a ledger as a function of student data (operation 402). For example, the program code may write a notification to the student's academic ledger if the student is determined to be a match for a program or job opening based on the student's grades and major. As another example, the program code may be configured to provide credits to a user for opting in to allow an institutional member to access certain student data. The manner in which the ledger is updated may thus vary from program to program.

Blockchain network 102 then deploys the program code on a set of peer nodes within the blockchain network (operation 404). For example, this code may be replicated to peer node 102*a* and 102*n*. The program code may be subject to the agreement of other members of a blockchain channel before the program code is deployed on the blockchain channel.

After the program code has been successfully deployed, a peer node receives a request from an application that invokes the program code (operation 406). For example, a student member may submit, via interface 314, a request to begin a credit transfer, which may invoke program code that defines how to execute the transfer between two educational institutions that are members of the blockchain channel. Additionally or alternatively, the user may submit, via interface 314, a request to sign up for a nursing study group. The invoked program code may update the study group membership list and the student's schedule.

Responsive to receiving the request, the invoked program code updates the state of a distributed ledger in the blockchain network 102 based on the particular set of student data (operation 408). In some embodiments, the invoked program code updates the student's academic ledger with the results. For example, the program code may write a confirmation of an applied transfer credit or the results of a match. Additionally or alternatively, the program code may update external ledgers, such as ledgers in other blockchain channels or blockchain networks, and/or other external systems. For instance, the program code may update a ledger for an institutional member with the top candidates matching a particular skill set. In other cases, the program code may export results to an external database or send notifications via email.

In some embodiments, blockchain programs may be associated with an API through which applications may invoke one or more functions provided through the program code. The API may define parameters for invoking the one or more functions. For example, an application invoking a function to update a ledger may pass a blockchain channel identifier to identify which ledger to update, a public key that allows updates to the ledger, and/or other parameters for performing the update. The invoke program code may bind the passed data to program variables and execute the invoked functions. The program code may return a transaction result to the requesting application, such as a message indicating if the transaction successfully completed and, if not, reasons why the transaction failed.

6. Computer Networks And Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
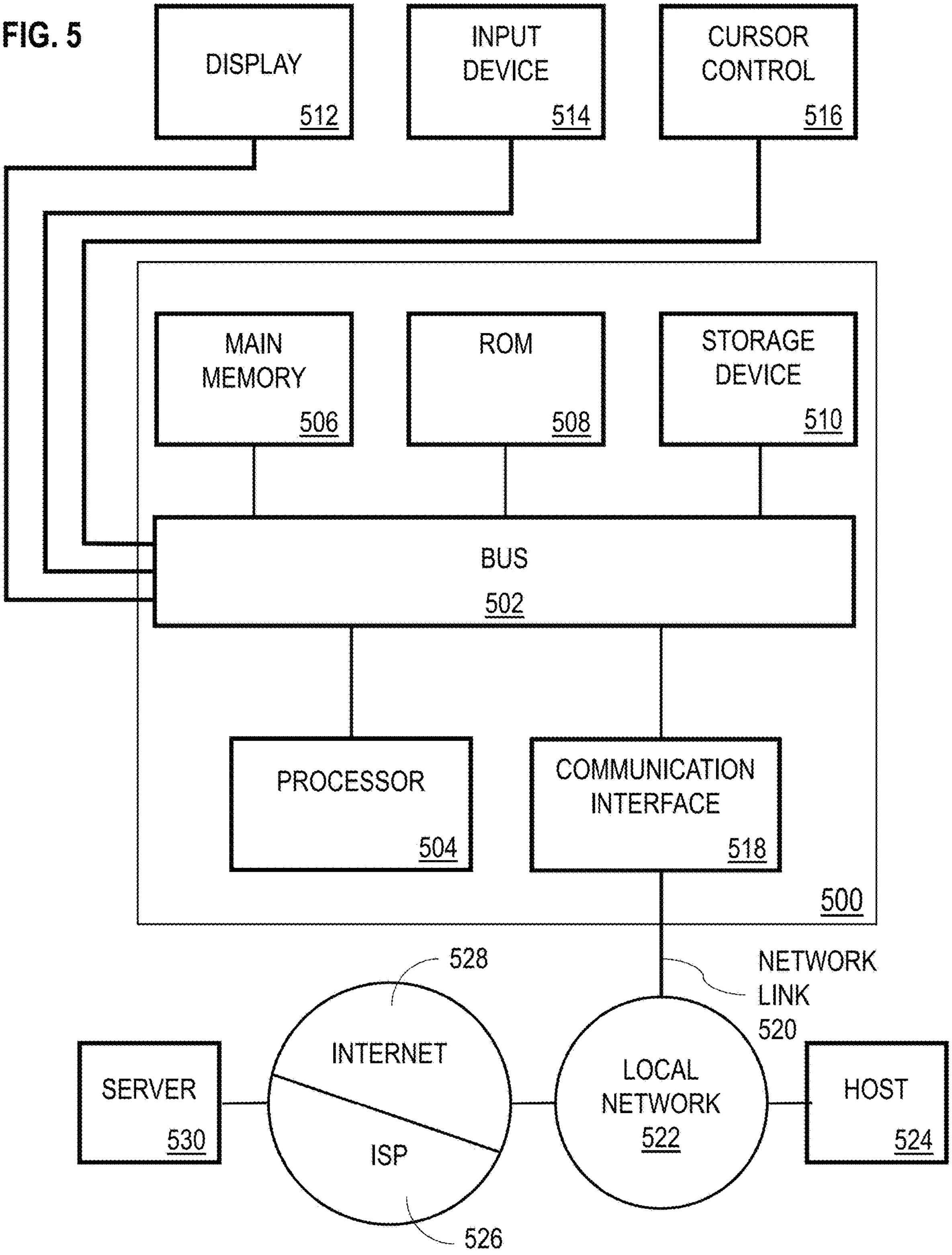
FIG. 5 shows a block diagram that illustrates a computer system in accordance with one or more embodiments.

For example, FIG. 5 is a block diagram that illustrates computer system 500 upon which an embodiment of the invention may be implemented. Computer system 500 includes bus 502 or other communication mechanism for communicating information, and a hardware processor 504 coupled with bus 502 for processing information. Hardware processor 504 may be, for example, a general purpose microprocessor.

Computer system 500 also includes main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes read only memory (ROM) 508 or other static storage device coupled to bus 502 for storing static information and instructions for processor 504. Storage device 510, such as a magnetic disk or optical disk, is provided and coupled to bus 502 for storing information and instructions.

Computer system 500 may be coupled via bus 502 to display 512, such as a cathode ray tube (CRT) or light emitting diode (LED) monitor, for displaying information to a computer user. Input device 514, which may include alphanumeric and other keys, is coupled to bus 502 for communicating information and command selections to processor 504. Another type of user input device is cursor control 516, such as a mouse, a trackball, touchscreen, or cursor direction keys for communicating direction information and command selections to processor 504 and for controlling cursor movement on display 512. Input device 514 typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 500 can receive the data on the network line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable media storing instructions, which, when executed by one or more hardware processors cause operations comprising:

receiving, by a blockchain network from an application, a first request that is digitally signed using a private key of a student member of the blockchain network, wherein the blockchain network includes a plurality of student members and institutional members, wherein the blockchain network is permissioned to restrict access to a distributed ledger, wherein the distributed ledger includes a set of student data associated with the student member that is replicated across a plurality of peer nodes;

responsive to the first request that is digitally signed using the private key of the student member of the blockchain network, granting, by program code deployed on the blockchain network to a blockchain program associated with an institutional member of the blockchain network, a public key that pairs with the private key;

receiving, from the blockchain program, a second request update the set of student data on the distributed ledger in the blockchain network;

responsive to receiving the second request, verifying, by the blockchain network, the public key granted to the blockchain program;

responsive to verifying the public key granted to the blockchain program, executing, by the blockchain network, at least one blockchain transaction to generate an updated set of student data in the distributed ledger; and enforcing, by the blockchain network, a consensus protocol between the plurality of peer nodes that prevents editing the updated set of student data using the private key, wherein enforcing the consensus protocol includes:

denying, by the blockchain network, attempts to modify the updated set of student data using the private key and allowing modifications to the updated set of student data using the public key granted to the blockchain program.

2. The non-transitory computer-readable media of claim 1, wherein enforcing the consensus protocol permits the institutional member of the blockchain network to revoke or remove content from the distributed ledger that was written to the distributed ledger using the public key that pairs with the private key and prevents the institutional member from granting access to the content to other institutional members of the blockchain network.

3. The non-transitory computer-readable media of claim 1, wherein executing the at least one blockchain transaction comprises writing official transcript data to the distributed ledger, wherein the private key allows the student member to grant other members of the blockchain network access to the official transcript data, wherein the blockchain network prevents the student member from editing the official transcript data using the private key.

4. The non-transitory computer-readable media of claim 1, wherein executing the at least one blockchain transaction comprises writing data identifying an award, skill set, or other achievement officially recognized by a professional institution to the distributed ledger.

5. The non-transitory computer-readable media of claim 1, wherein institutional membership in the blockchain network is restricted to institutional members that have been approved by a set of one or more founding members of the blockchain network.

6. The non-transitory computer-readable media of claim 1, the operations further comprising: receiving a third request to transfer at least one of credits or a transcript from one institutional member of the blockchain network to another institutional member of the blockchain network, and responsive to the third request, executing at least one blockchain transaction that accesses the updated set of student data.

7. The non-transitory computer-readable media of claim 1, the operations further comprising: accessing the set of student data by a mobile application using the private key for the student member; wherein the mobile application displays a graphical user interface that allows the student member to interact with applications on the blockchain network and initiate different types of transactions on the blockchain network; receiving a third request through the graphical user interface of the mobile application; wherein the third request causes a REST-based endpoint to invoke a blockchain program deployed on one or more nodes in the blockchain network.

8. The non-transitory computer-readable media of claim 7, wherein the invoked blockchain program determines a best match employer, educational institution, or curriculum for the student member based on one or more student attributes identified in the set of student data; wherein the best match is presented through the graphical user interface of the mobile application.

9. The non-transitory computer-readable media of claim 1, further comprising generating a package of student data written to the distributed ledger by different members of the blockchain network.

10. A method comprising:

receiving, by a blockchain network from an application, a first request that is digitally signed using a private key of a student member of the blockchain network, wherein the blockchain network includes a plurality of student members and institutional members, wherein the blockchain network is permissioned to restrict access to a distributed ledger, wherein the distributed ledger includes a set of student data associated with the student member that is replicated across a plurality of peer nodes;

responsive to the first request that is digitally signed using the private key of the student member of the blockchain network, granting, by program code deployed on the blockchain network to a blockchain program associated with an institutional member of the blockchain network, a public key that pairs with the private key;

receiving, from the blockchain program, a second request update the set of student data on the distributed ledger in the blockchain network;

responsive to receiving the second request, verifying, by the blockchain network, the public key granted to the blockchain program;

responsive to verifying the public key granted to the blockchain program, executing, by the blockchain network, at least one blockchain transaction to generate an updated set of student data in the distributed ledger; and enforcing, by the blockchain network, a consensus protocol between the plurality of peer nodes that prevents editing the updated set of student data using the private key, wherein enforcing the consensus protocol includes:

denying, by the blockchain network, attempts to modify the updated set of student data using the private key and allowing modifications to the updated set of student data using the public key granted to the blockchain program.

11. The method of claim 10, wherein enforcing the consensus protocol permits the institutional member of the blockchain network to revoke or remove content from the distributed ledger that was written to the distributed ledger using the public key that pairs with the private key and prevents the institutional member from granting access to the content to other institutional members of the blockchain network.

12. The method of claim 10, wherein executing the at least one blockchain transaction comprises writing official transcript data to the distributed ledger, wherein the private key allows the student member to grant other members of the blockchain network access to the official transcript data, wherein the blockchain network prevents the student member from editing the official transcript data using the private key.

13. The method of claim 10, wherein executing the at least one blockchain transaction comprises writing data identifying an award, skill set, or other achievement officially recognized by a professional institution to the distributed ledger.

14. The method of claim 10, wherein institutional membership in the blockchain network is restricted to institutional members that have been approved by a set of one or more founding members of the blockchain network.

15. The method of claim 10, further comprising: receiving a third request to transfer at least one of credits or a transcript from one institutional member of the blockchain network to another institutional member of the blockchain network, and responsive to the third request, executing at least one blockchain transaction that accesses the updated set of student data.

16. The method of claim 10, further comprising: accessing the set of student data by a mobile application using the private key for the student member; wherein the mobile application displays a graphical user interface that allows the student member to interact with applications on the blockchain network and initiate different types of transactions on the blockchain network; receiving a third request through the graphical user interface of the mobile application; wherein the third request causes a REST-based endpoint to invoke a blockchain program deployed on one or more nodes in the blockchain network.

17. The method of claim 16, wherein the invoked blockchain program determines a best match employer, educational institution, or curriculum for the student member based on one or more student attributes identified in the set of student data; wherein the best match is presented through the graphical user interface of the mobile application.

18. The method of claim 10, further comprising generating a package of student data written to the distributed ledger by different members of the blockchain network.

19. A system comprising:

one or more hardware processors;

one or more non-transitory computer-readable media storing instructions, which, when executed by one or more hardware processors cause:

receiving, by a blockchain network from an application, a first request that is digitally signed using a private key of a student member of the blockchain network, wherein the blockchain network includes a plurality of student members and institutional members, wherein the blockchain network is permissioned to restrict access to a distributed ledger, wherein the distributed ledger includes a set of student data associated with the student member that is replicated across a plurality of peer nodes;

responsive to the first request that is digitally signed using the private key of the student member of the blockchain network, granting, by program code deployed on the blockchain network to a blockchain program associated with an institutional member of the blockchain network, a public key that pairs with the private key;

receiving, from the blockchain program, a second request update the set of student data on the distributed ledger in the blockchain network;

responsive to receiving the second request, verifying, by the blockchain network, the public key granted to the blockchain program;

responsive to verifying the public key granted to the blockchain program, executing, by the blockchain network, at least one blockchain transaction to generate an updated set of student data in the distributed ledger; and enforcing, by the blockchain network, a consensus protocol between the plurality of peer nodes that prevents editing the updated set of student data using the private key, wherein enforcing the consensus protocol includes:

denying, by the blockchain network, attempts to modify the updated set of student data using the private key and allowing modifications to the updated set of student data using the public key granted to the blockchain program.

20. The system of claim 19, wherein enforcing the consensus protocol permits the institutional member of the blockchain network to revoke or remove content from the distributed ledger that was written to the distributed ledger using the public key that pairs with the private key and prevents the institutional member from granting access to the content to other institutional members of the blockchain network.

* * * * *